US012753637B2

(12) United States Patent
Eller et al.

(10) Patent No.: US 12,753,637 B2
(45) Date of Patent: Oct. 6, 2026

(54) EXIT DEVICE PUSH FORCE REDUCER

(71) Applicant: ASSA ABLOY Access and Egress Hardware Group, Inc., New Haven, CT (US)

(72) Inventors: Darren C. Eller, Madison, CT (US); Jason Sloan, Middlebury, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 16 days.

(21) Appl. No.: 18/938,400

(22) Filed: Nov. 6, 2024

(65) Prior Publication Data

US 2025/0215728 A1 Jul. 3, 2025

Related U.S. Application Data

(60) Provisional application No. 63/615,433, filed on Dec. 28, 2023.

(51) Int. Cl.
*E05B 65/10* (2006.01)

(52) U.S. Cl.
CPC ................................ *E05B 65/1053* (2013.01)

(58) Field of Classification Search
CPC ................................................... E05B 65/1053
See application file for complete search history.

(56) References Cited

U.S. PATENT DOCUMENTS

| | | | | |
|---|---|---|---|---|
| 8,267,440 | B2 * | 9/2012 | Shen | E05B 65/1006 292/DIG. 65 |
| 9,580,944 | B2 * | 2/2017 | Arlinghaus | E05B 53/005 |
| 10,072,444 | B2 * | 9/2018 | Lehner, Jr. | E05B 65/1053 |
| 10,662,671 | B2 * | 5/2020 | Stallbaumer | E05C 9/043 |
| 10,844,637 | B2 * | 11/2020 | Yalamati | E05B 65/1086 |
| 11,118,378 | B1 * | 9/2021 | Sprague | E05B 65/1006 |
| 11,332,961 | B2 * | 5/2022 | Arlinghaus | E05B 47/0001 |
| 12,054,970 | B2 * | 8/2024 | Komadina | E05B 65/1093 |
| 2008/0012350 | A1 * | 1/2008 | Condo | E05B 65/1093 292/92 |
| 2011/0215599 | A1 * | 9/2011 | Baragano Gonzalez | E05B 47/00 292/259 R |
| 2015/0184426 | A1 * | 7/2015 | Arlinghaus | E05B 65/1053 292/138 |
| 2025/0257589 | A1 * | 8/2025 | Eller | E05B 65/1093 |
| 2025/0290347 | A1 * | 9/2025 | Sloan | E05B 17/0045 |

* cited by examiner

*Primary Examiner* — Mark A Williams
(74) *Attorney, Agent, or Firm* — Wolf, Greenfield & Sacks, P.C.

(57) ABSTRACT

Exit device push force reducers are disclosed. An exit device includes a push bar movable between an actuated position and an unactuated position. An arm is operatively coupled to the push bar and is movable between a first arm position and a second arm position. A slide is operatively coupled to the arm and is movable between a first slide position and a second slide position. Movement of the push bar from the unactuated position to the actuated position moves the arm from the first arm position to the second arm position. Movement of the arm from the first arm position to the second arm position moves the slide from the first slide position to the second slide position. One or more biasing members are coupled to the slide and are configured to bias the slide to the second slide position, thereby reducing a force to move the push bar from the unactuated position to the actuated position.

27 Claims, 10 Drawing Sheets

EXIT DEVICE PUSH FORCE REDUCER

RELATED APPLICATIONS

This Application is a Non-Provisional of U.S. Application Ser. No. 63/615,433, filed Dec. 28, 2023, entitled "EXIT DEVICE PUSH FORCE REDUCER," the entire contents of which is incorporated herein by reference in its entirety.

FIELD

Disclosed embodiments are related to push force reducers for exit devices.

BACKGROUND

Exit devices are often used to secure doors. The exit devices often include actuators such as push bars which may be actuated to open the door. Users may push the push bar to actuate the push bar and open the door. Regulations exist which regulate various aspects of exit device, including the pushing force required to actuate the push bar of a door.

SUMMARY

In some embodiments, an exit device comprises a push bar movable between an unactuated position and an actuated position; an arm operatively coupled to the push bar, wherein the arm is movable between a first arm position and a second arm position, and wherein movement of the push bar from the unactuated position to the actuated position moves the arm from the first arm position to the second arm position; a slide operatively coupled to the arm, wherein the slide is movable in a linear direction of movement between a first slide position and a second slide position, and wherein movement of the arm from the first arm position to the second arm position moves the slide from the first slide position to the second slide position; and one or more biasing members coupled to the slide and configured to bias the slide to the second slide position, thereby reducing a force to move the push bar from the unactuated position to the actuated position.

In some further embodiments, an exit device comprises: a push bar movable between an unactuated position and an actuated position; an arm operatively coupled to the push bar, wherein the arm is movable between a first arm position and a second arm position, and wherein movement of the push bar from the unactuated position to the actuated position moves the arm from the first arm position to the second arm position; a lever operatively coupled to the arm, wherein the lever is movable between a first lever position and a second lever position, and wherein movement of the arm from the first arm position to the second arm position moves the lever from the first lever position to the second lever position; a slide operatively coupled to the lever, wherein the slide is movable in a linear direction of movement between a first slide position and a second slide position, and wherein movement of the lever from the first lever position to the second lever position moves the slide from the first slide position to the second slide position; and one or more biasing members coupled to the slide and configured to bias the slide to the second slide position, thereby reducing a force to move the push bar from the unactuated position to the actuated position.

In some even further embodiments, an exit device comprises: a push bar movable between an unactuated position and an actuated position; an arm operatively coupled to the push bar, wherein the arm is rotatable between a first arm position and a second arm position, and wherein movement of the push bar from the unactuated position to the actuated position rotates the arm from the first arm position to the second arm position; a lever operatively coupled to the arm, wherein the lever is rotatable between a first lever position and a second lever position, and wherein rotation of the arm from the first arm position to the second arm position rotates the lever from the first lever position to the second lever position; a slide operatively coupled to the lever, wherein the slide is movable in a linear direction of movement between a first slide position and a second slide position, and wherein rotation of the lever from the first lever position to the second lever position moves the slide from the first slide position to the second slide position, wherein the exit device is configured to be coupled to a door; a rod operatively coupled to a latch for securing the door, wherein the rod is operatively coupled to the slide, wherein the rod is movable between a first rod position and a second rod position, and wherein movement of the slide from the first slide position to the second slide position moves the rod from the first rod position to the second rod position, wherein the latch is movable between a latched position and an unlatched position, and wherein movement of the rod from the first rod position to the second rod position moves the latch from latched position to the unlatched position; and one or more springs coupled to the slide and configured to bias the slide to the second slide position, thereby reducing a force to move the push bar from the unactuated position to the actuated position.

In some even further still embodiments, an exit device comprises: a push bar movable between an unactuated position and an actuated position; a bolt operatively coupled to the push bar, wherein the bolt is movable between a bolt extended position and a bolt retracted position, and wherein movement of the push bar from the unactuated position to the actuated position moves the bolt from the bolt extended position to the bolt retracted position and wherein the bolt is configured to secure the exit device in the bolt extended position; an arm operatively coupled to the push bar, wherein the arm is movable between a first arm position and a second arm position, and wherein movement of the push bar from the unactuated position to the actuated position moves the arm from the first arm position to the second arm position; and one or more biasing members coupled to the arm and configured to bias the arm to the second arm position, thereby reducing a force to move the push bar from the unactuated position to the actuated position.

In some yet even further still embodiments, an exit device comprises: a push bar movable between an unactuated position and an actuated position; an arm operatively coupled to the push bar, wherein the arm is movable between a first arm position and a second arm position, and wherein movement of the push bar from the unactuated position to the actuated position moves the arm from the first arm position to the second arm position; a slide plate operatively coupled to the arm, wherein the slide is movable in a linear direction of movement between a first slide plate position and a second slide plate position, and wherein movement of the arm from the first arm position to the second arm position moves the slide plate from the first slide plate position to the second slide plate position; and one or more biasing members coupled to the slide plate and configured to bias the slide plate to the second slide plate position, thereby reducing a force to move the push bar from the unactuated position to the actuated position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
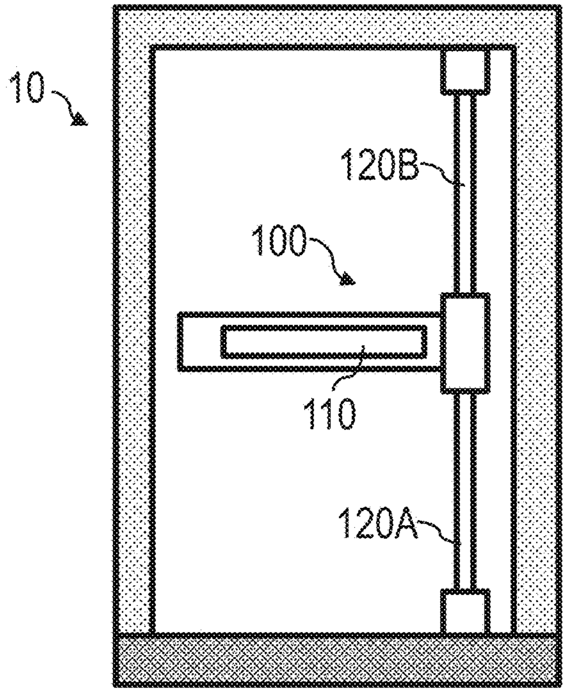
FIG. 1A shows a schematic view of an exit device configured to be coupled to a door including multiple rods according to some embodiments.

Various regulatory requirements exist which specify requirements for exit devices. For example, The Americans with Disabilities Act (ADA) establishes requirements for user-applied forces associated with operating exit devices. Specifically, the ADA establishes that the force required to activate a panic bar of an exit device must be below a specified force. Such a requirement may help to enable individuals with disabilities and/or limited strength to operate exit devices safely. Typically, the force required to activate a panic bar of an exit device must be below 15 lbf. Recently, the ADA has established that the force required to activate a panic bar of an exit device must be below 5 lbf in some cases.

This recent change has prompted alterations to existing exit devices in order to comply with the changed requirement. However, the inventor has recognized that exit devices including traditional door bolts and vertical rods are relatively complicated to make compliant with the updated requirement, especially in the case of surface vertical rods. For example, altering the materials and/or geometry of one or more components of the exit device (e.g., vertical rods), may result in the exit device being out of compliance with one or more other requirements. For example, reducing the weight of the vertical rod by altering the material of the rod may make the exit device non-compliant with pull-strength requirements. In another example, altering the latch of the exit device may make the exit device non-compliant with fire safety and/or security requirements. Accordingly, the inventor has recognized a need for an exit device that may be actuated with a reduced push force and may be used with various arrangements, including vertical surface rods.

The inventor has recognized improvements for exit devices for reducing forces required to actuate the exit devices. The improved exit devices may include a biasing member configured to reduce a force to move an actuator of the exit device. For example, the exit device may include a biasing member configured to reduce a force to move (e.g., push) a push bar from an unactuated position to an actuated position. The reduced force is no more than 5 lbf according to some preferred embodiments, and as such the improved exit device may be compliant with the aforementioned updated ADA requirement. The inventor has recognized the improvements may be cost-effective, have a relatively low or zero increase on the size of the exit device, be simple to manufacture, and/or simple to use.

The improved exit device may include various moveable components operatively coupled to the push bar configured to enable operation of the exit device. For example, the exit device may include an arm operatively coupled to the push bar, wherein the arm is movable between a first arm position and a second arm position, and wherein movement of the push bar from the unactuated position to the actuated position moves the arm from the first arm position to the second arm position. The exit device may also include a slide operatively coupled to the arm. The slide may be movable in a linear direction of movement between a first slide position and a second slide position, and movement of the arm from the first arm position to the second arm position may move the slide from the first slide position to the second slide position. As mentioned above, the exit device may include a biasing member configured to reduce the force to actuate the exit device. The biasing member may be coupled to the slide and may be configured to bias the slide to the second slide position, thereby reducing a force to move the push bar from the unactuated position to the actuated position.

The biasing member may also be coupled to other any other appropriate portion of the exit device and configured to reduce a force to move the push bar from the unactuated position to the actuated position. For example, the biasing member may be configured to bias the arm to the second arm position to reduce a force to move the push bar from the unactuated position to the actuated position. In another example, the exit device includes a bolt operatively coupled to the push bar and configured to move between a retracted bolt position and an extended bolt position and the biasing member is configured to bias the bolt to the retracted bolt position to reduce a force to move the push bar from the unactuated position to the actuated position. In a further example, the exit device includes a slide plate operatively coupled to the push bar and configured to move between a first slide plate position and a second slide plate position, and the biasing member is configured to bias the slide plate to the second position, thereby reducing a force to move the push bar from the unactuated position to the actuated position. Optionally, multiple biasing members may be employed and coupled to the slide as well as any other appropriate component of the exit device and configured to reduce a force to move the push bar from the unactuated position to the actuated position.

In some embodiments, the exit device includes a lever operatively coupled to the arm and the lever is movable between a first lever position and a second lever position. Movement of the arm from the first arm position to the second arm position may move the lever from the first lever position to the second lever position. In some embodiments, the exit device is configured to be coupled to a door. In such embodiments, the exit device may also include a rod operatively coupled to a latch for securing the door, wherein the rod is operatively coupled to the slide, wherein the rod is movable between a first rod position and a second rod position, and wherein movement of the slide from the first slide position to the second slide position moves the rod from the first rod position to the second rod position. The latch may be movable between a latched position and an unlatched position, and movement of the rod from the first rod position to the second rod position may move the latch from latched position to the unlatched position. One or more biasing members may be coupled to any appropriate movable component or combination of moveable components described herein, including the arm, lever, and/or rod to reduce the force to move the push bar as the disclosure is not limited in this fashion. As should be appreciated, the rod(s) may be a surface vertical rod(s) or a concealed vertical rods(s).

The biasing member may be a spring, according to some embodiments. For example, the biasing member may be an extension spring, compression spring, or torsion spring. Embodiments including multiple biasing members may use one or more of or any appropriate combination of the foregoing springs as the disclosure is not limited in this sense. In some cases, the biasing member may be selected based at least in part on dimensions, weights, and/or other parameters of other components of the exit device. For example, in embodiments where the exit device includes relatively heavy rods operatively coupled to the push bar, the force to actuate the push bar is higher due to the increased force of gravity that must be overcome to move the heavy rods. In these embodiments, the biasing member may be selected/formed to further reduce the force required to actuate the associated push bar to compensate for the increased force of gravity. Rods may be heavier, for example, in embodiments where the exit device is configured to be coupled to a door of a relatively great height requiring longer (and therefore heavier) rods. A biasing member may be selected/formed to have an appropriate stiffness and may correspondingly reduce the force to actuate the push bar appropriately.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
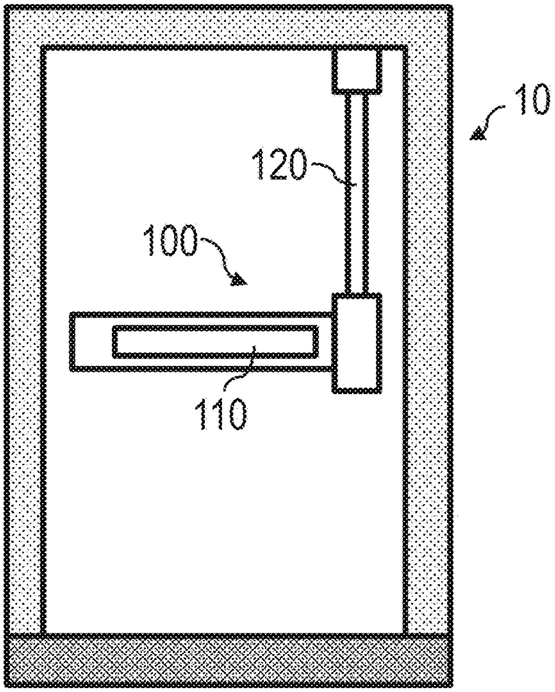
FIG. 1B shows a schematic view of an exit device configured to be coupled to a door including one rod according to some embodiments.
Figure 2:
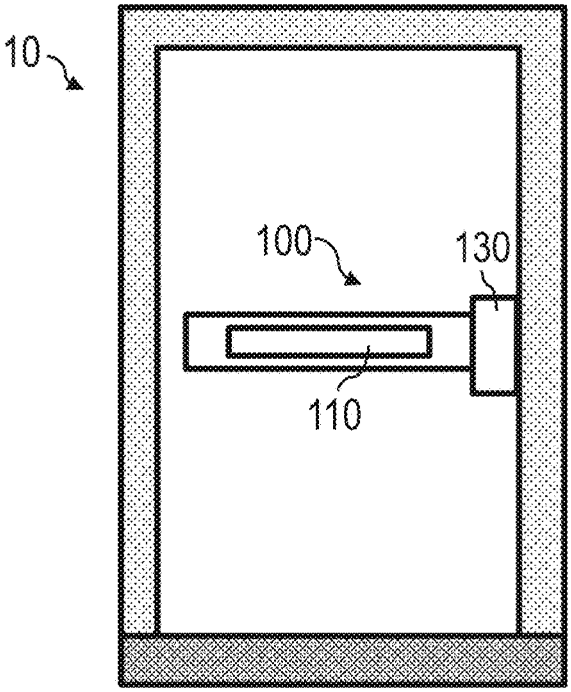
FIG. 2 shows a schematic view of an exit device configured to be coupled to a door including a latch assembly according to some embodiments.

As discussed herein, the exit device is configured to be coupled to a door according to some embodiments. For example, the exit device is shown coupled to a door in the depicted embodiments of FIGS. 1-2. More specifically, a door system 10 includes an exit device 100 having a push bar 110. In the depicted embodiments of FIGS. 1A and 1B, the exit device 100 also includes one or more rods 120 for securing the door. The rod 120 may be operatively coupled to a latch and/or latch assembly, which may be used to secure the door. For example, the push bar 110 may be actuated, and the rod 120 may move a latch or latch assembly to secure the door. Depending on the embodiment, a single rod or multiple rods is be used. For example, in the depicted embodiment of FIG. 1A, the exit device 100 includes two rods 120A, 120B. In the depicted embodiment of FIG. 1A, the rods 120A, and 120B are configured to secure the door on both of an upper and lower portion of a door frame. In another example, such as the depicted embodiment of FIG. 1B, the exit device 100 includes a single rod 120 configured to secure the door on an upper portion of a door frame. In the depicted embodiment of FIG. 2, the exit device includes a latch assembly 130 configured to secure the door on a side portion of the door frame. The latch assembly may include a door bolt (e.g., latch or bolt) configured to secure the door via the side portion of the door frame.

Figure 3A:
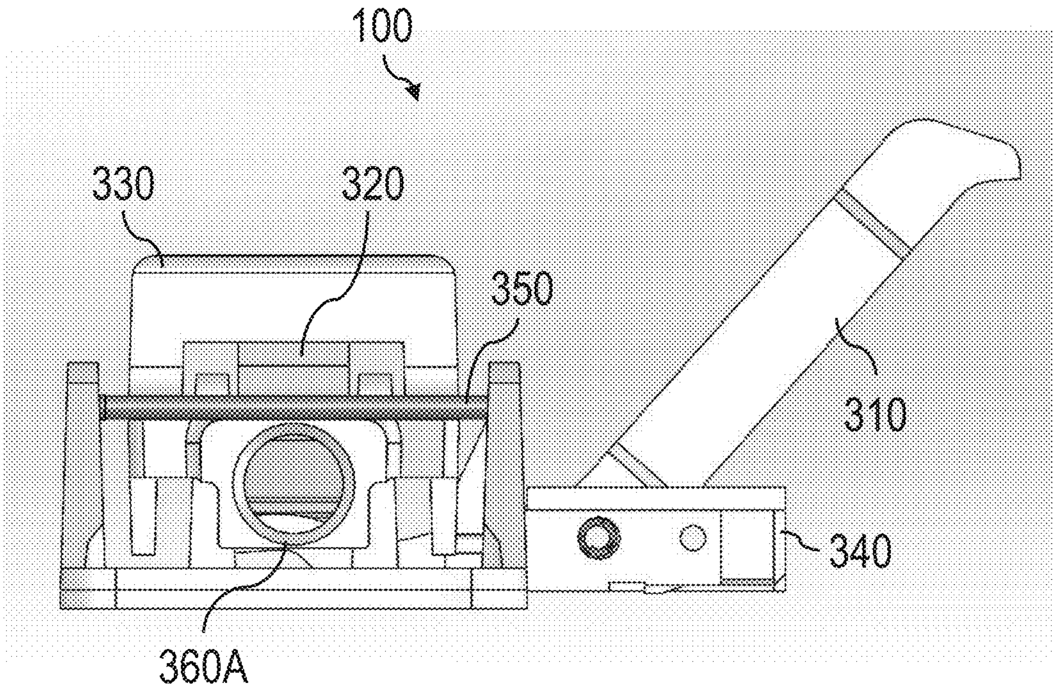
FIG. 3A shows a side view of an exit device in a first state according to some embodiments.
Figure 3B:
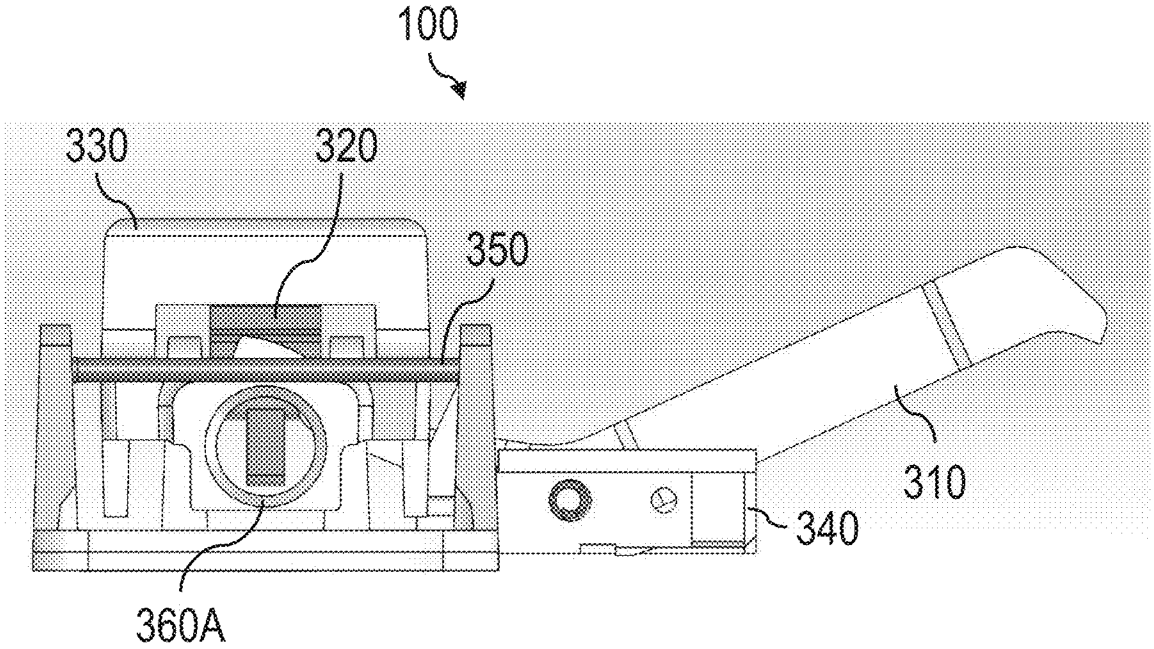
FIG. 3B shows a side view of an exit device in a second state according to some embodiments.

The depicted embodiments of FIGS. 3A and 3B show the exit device 100 in a first state and a second state, respectively. In the depicted embodiments, the exit device 100 includes an arm 310 operatively coupled to a lever 320, and the lever 320 is operatively coupled to a slide 330 (see also FIGS. 4A and 4B). In the depicted embodiments, the arm 310 and the lever 320 are both rotatably coupled to an exit device base 340. The exit device base 340 includes a base member 350, which, although depicted as a cylindrical rod in the figures, may be formed in any appropriate geometry as the disclosure is not so limited. The slide 330 includes an opening 360, which, as described further below, receives a rod according to some embodiments.

The arm 310 is movable between a first arm position and a second arm position. In some embodiments, the arm 310 is rotatable between the first arm position and the second arm position. As shown in the depicted embodiments of FIGS. 4A and 4B, the arm 310 is configured to rotate about a first axis of rotation "A". In some embodiments, the first axis of rotation "A" is parallel to a longitudinal axis of the exit device. The lever 320 is movable between a first lever position and a second lever position. In some embodiments, the lever 320 is rotatable between the first lever position and the second lever position. As shown in the depicted embodiments of FIGS. 4A and 4B, the lever 320 is configured to rotate about a second axis of rotation "B". In some embodiments, the second axis of rotation "B" is parallel to a transverse axis of the exit device. The slide 330 is movable between a first slide position and a second slide position. In some embodiments, the slide 330 is linearly movable between the first slide position and the second slide position. In embodiments including a rod, the rod is movable between a first rod position and a second rod position. In some embodiments, the rod is linearly movable between the first rod position and the second rod position. The rod may move from the first rod position to the second rod position in a direction of movement opposite to a local direction of gravity. In embodiments where the exit device 100 is configured to be coupled to a door, the longitudinal axis of the exit device may be parallel with a longitudinal axis of the door and the transverse axis of the exit device may be parallel with a transverse axis of the door.

Movement of the arm 310 from the first arm position to the second arm position moves the lever 320 from the first lever position to the second lever position according to some embodiments. For example, the arm 310 may engage (e.g., contact) the lever 320 as the arm moves from the first arm position to the second arm position, thereby moving the lever 320. Movement of the lever 320 from the first lever position to the second lever position moves the slide 330 from the first slide position to the second slide position according to some embodiments. For example, the lever 320 may engage (e.g., contact) the slide 330 as the lever moves from the first lever position to the second lever position, thereby moving the slide 330. In some embodiments, the lever 320 moves from the first lever position to the second lever position in a direction of movement that is opposite to a local direction of gravity. In some embodiments, the slide 330 moves from the first slide position to the second slide position in a direction of movement that is opposite to a local direction of gravity. In embodiments including a rod, movement of the slide 330 from the first slide position to the second slide position may move the rod from the first rod position to the second rod position.

In the depicted embodiment of FIG. 3A, in the first state, the push bar (not shown) associated with the exit device 100 is in an unactuated position, the arm 310 is in a first arm position, the lever 320 is in a first lever position, and the slide 330 is in a first slide position. In some embodiments, a rod is coupled to the slide 330 and is in a first rod position while the exit device 100 is in the first state. In the depicted embodiment of FIG. 3B, in the second state, the push bar (not shown) associated with the exit device 100 is in an actuated position, the arm 310 is in a second arm position, the lever 320 is in a second lever position, and the slide 330 is in a second slide position. In embodiments including the rod, the rod is in a second rod position while the exit device 100 is in the second state.

The exit device 100 may include a biasing member 420 configured to reduce the force to move the push bar from the unactuated position to the actuated position. The biasing member 420 may be coupled to any appropriate movable component of the exit device 100, including but not limited to the push bar, the arm 310, the lever 320, the slide 330, and/or the rod. For example, in the depicted embodiment of FIG. 4A, the biasing member 420 is formed as an extension spring coupled to a slide attachment point 410 of the slide 330 and the base member 350. It should be appreciated however, that the biasing member 420 may couple to any appropriate portion of the exit device base 340, including but not limited to the base member 350. The slide attachment point 410 may be formed in any appropriate geometry and at any appropriate position on the slide 330 as the disclosure is not limited in this sense. As discussed further in regard to FIG. 5A, the slide 330 may optionally include multiple attachment points 410. The biasing member 420 may be configured to bias the slide 330 to the second slide position. Biasing the slide 330 to the second slide position reduces the force required to move the slide 330 towards the second slide position. Reducing the force required to move the slide 330 towards the second slide position may in turn reduce the force required to move the lever 320 towards the second lever position. Following from this, reducing the force required to move the lever 320 towards the second lever position may in turn reduce the force required to move the arm 310 towards the second arm position. Finally, reducing the force required to move the arm 310 towards the second arm position may in turn reduce the force required to move the push bar from the unactuated position to the actuated position.

In embodiments including one or more rods coupled to the exit device 100, the rod may couple to the slide 330. For example, the rod may couple to (e.g., be received by) an opening 360 on the slide 330. In some embodiments, the rod and the opening 360 include threads to allow the rod to be threaded onto the slide 330, thereby forming a threaded connection between the rod and the slide 330. However, it should be appreciated that the rod may couple to the exit device 100 in any appropriate fashion including but not limited to pins or any other appropriate fastener as the disclosure is not limited in this sense. In some embodiments, two rods couple to the slide 330 via two openings 360A, 360B.

Figure 4A:
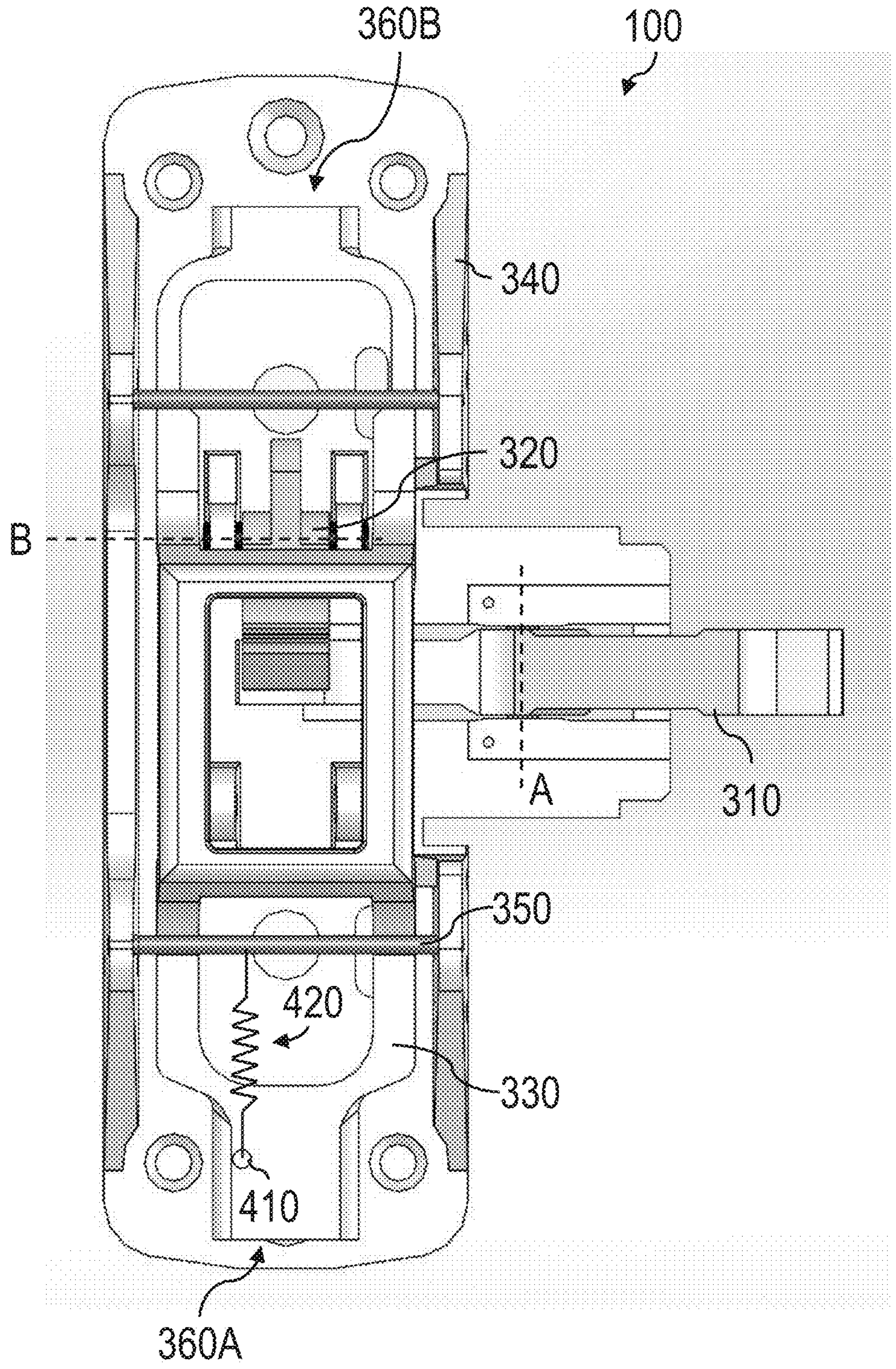
FIG. 4A shows a top view of an exit device in a first state according to some embodiments.
Figure 4B:
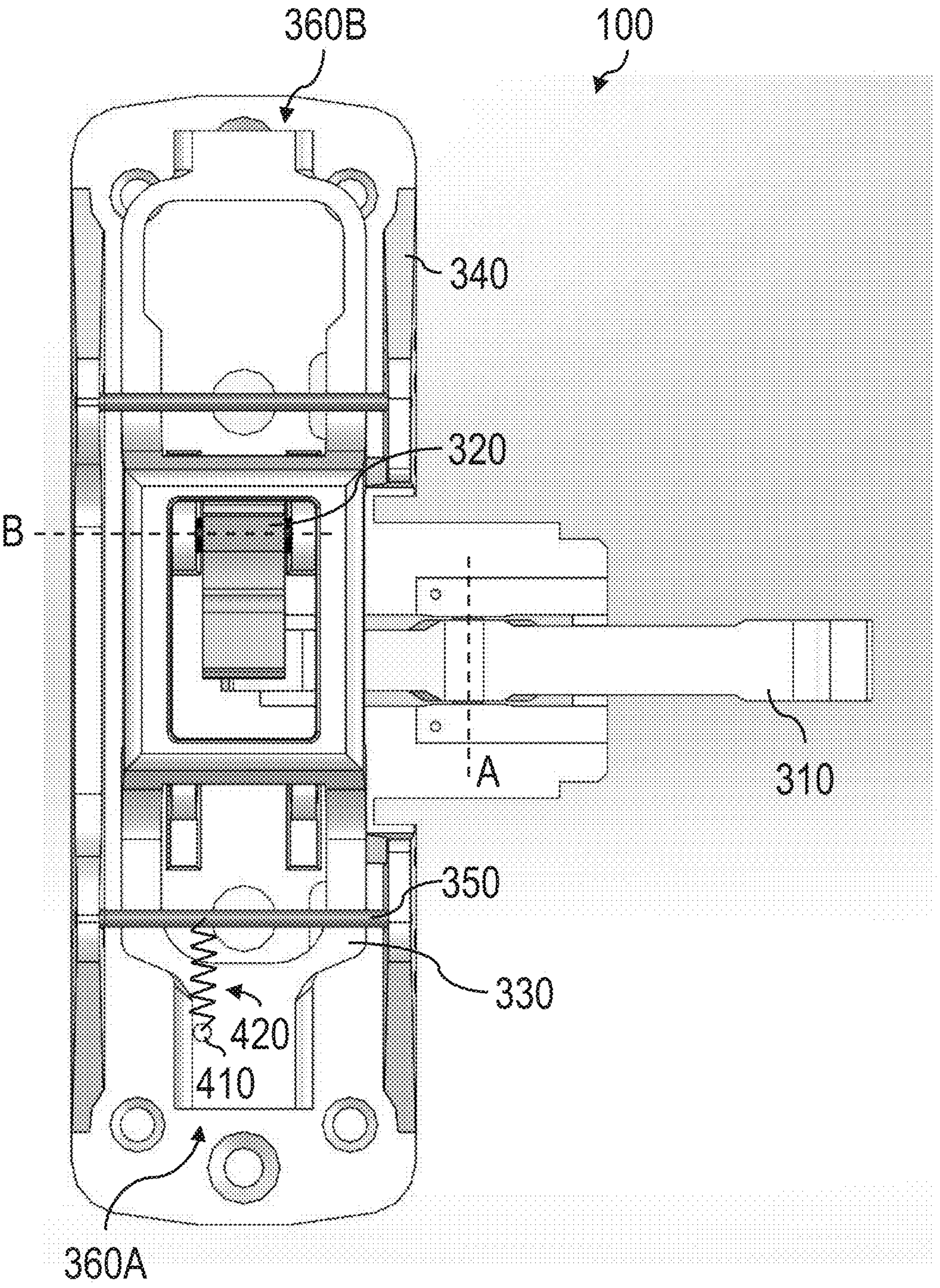
FIG. 4B shows a top view of an exit device in a second state according to some embodiments.
Figure 5A:
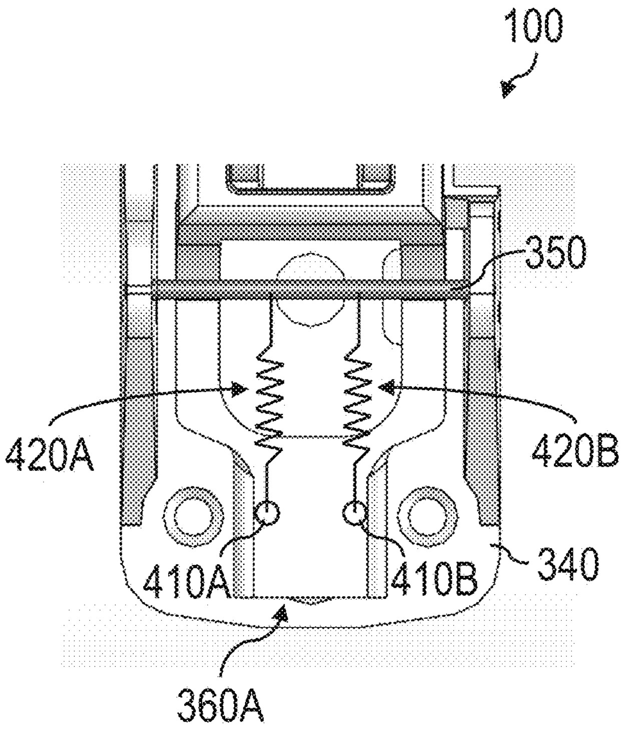
FIG. 5A shows a top view of a portion of an exit device including multiple biasing members according to some embodiments.

In some embodiments, the slide 330 includes a slot, including the depicted embodiments of FIGS. 4A and 4B. The slot may be substantially rectangular and may be formed substantially central to the slide 330 relative to a longitudinal axis of the slide 330 and/or a transverse axis of the slide 330. However, the slot may be formed at any appropriate position of the slide 330 as the disclosure is not limited in this sense. The lever 320 may be configured to contact the slot of the slide 330 according to some embodiments. In some embodiments, the lever 320 is operatively coupled to the slide 330 via the contact between the lever 320 and the slot (e.g., an inner surface of the slot) of the slide 330. For example, the lever 320 may contact the slot as the lever 320 moves from the first lever position to the second lever position, and the movement of the lever 320 may move the slide 330 from the first slide position to the second slide position.

As previously introduced, any embodiments of the exit device 100 described herein may include any appropriate number of biasing members 420. For example, in the depicted embodiment of FIG. 5A, the exit device 100 includes two biasing members 420A, 420B formed as extension springs coupled to the base member 350 and respective slide attachment points 410A, 410B. Further, any appropriate number of biasing elements 420 may be coupled to any appropriate portion of the exit device base 340 as the disclosure is not limited in this fashion. For example, a first biasing member 420A may be coupled to a lower portion of the slide 330 and a first base member, and a second biasing member 420B may be coupled to an upper portion of the slide 330 and a second base member. As described herein, any appropriate biasing member 420 or combination of biasing members may be used in the exit device 100. The biasing member or combination of biasing members may reduce a force to move the push bar of the exit device 100 from the unactuated position to the actuated position preferably to be equal to or less than 5 lbf, or other appropriate forces.

Figure 5B:
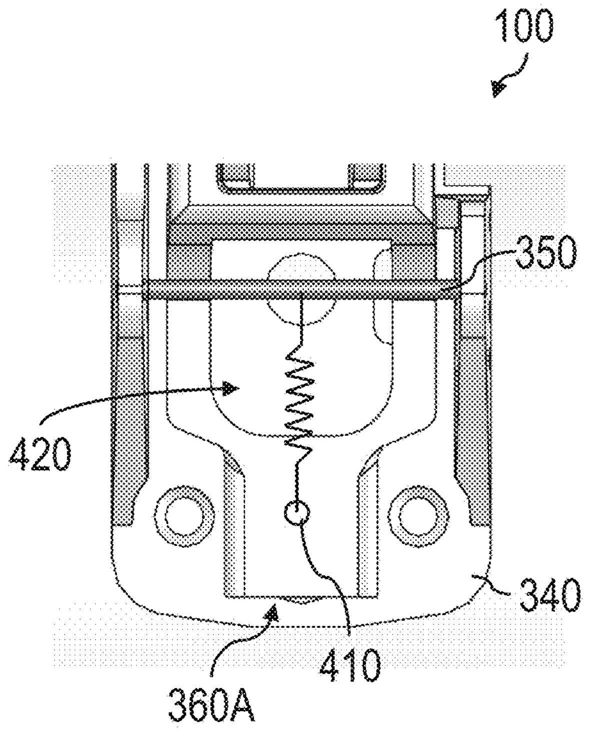
FIG. 5B shows a top view of a portion of an exit device including a single biasing member according to some embodiments.

As mentioned above, the one or more slide attachment points 410 may be positioned at any appropriate location of the slide 330. For example, in the depicted embodiment of FIG. 5B, the slide attachment point may be disposed substantially central to a transverse axis of the slide 330. The slide attachment point 410 may optionally be positioned centrally to reduce or eliminate a moment caused by forces associated with the biasing member 420 while operating the exit device 100. In the depicted embodiment of FIG. 5A, the slide attachment points 410A, 410B may be positioned symmetrically about a longitudinal axis of the slide 330.

Optionally positioning the attachment points 410 symmetrically may reduce or eliminate a moment caused by forces associated with the biasing member 420 while operating the exit device 100. However, it should be appreciated that the slide attachment points 410 need not be positioned centrally or symmetrically relative to an axis of the slide 330 as the disclosure is not limited in this sense.

In some embodiments, the push bar includes one or more push bar biasing members configured to bias the push bar to the actuated position and/or the arm 310 to the second arm position. For example, the push bar may include one or more compression springs, tension springs, torsion springs, any combination thereof, and any other appropriate biasing member configured to bias the push bar to the actuated position and/or the arm 310 to the second arm position.

As previously discussed, the exit devices herein may optionally include a door bolt configured to selectively secure the exit device. In the depicted embodiment of FIG. 6, an exit device 600 includes a bolt 610 movable between a retracted bolt position and an extended bolt position. The bolt may secure the exit device 600 in the extended position, for example via a side portion of a door frame. The depicted embodiment of FIG. 6 as well as the depicted embodiments of FIGS. 7-10, discussed further below, may include a latch in place of or in addition to the rods as discussed herein. Also, the depicted embodiments of FIGS. 6-10 need not include vertical rods, as the embodiments described herein may be adapted for use in any appropriate exit device as the disclosure is not so limited. Also, it should be appreciated that the term "bolt" may be used interchangeable herein with the term "latch", as the present disclosure is not limited to the type of component that engages with the strike or door jamb.

Figure 6:
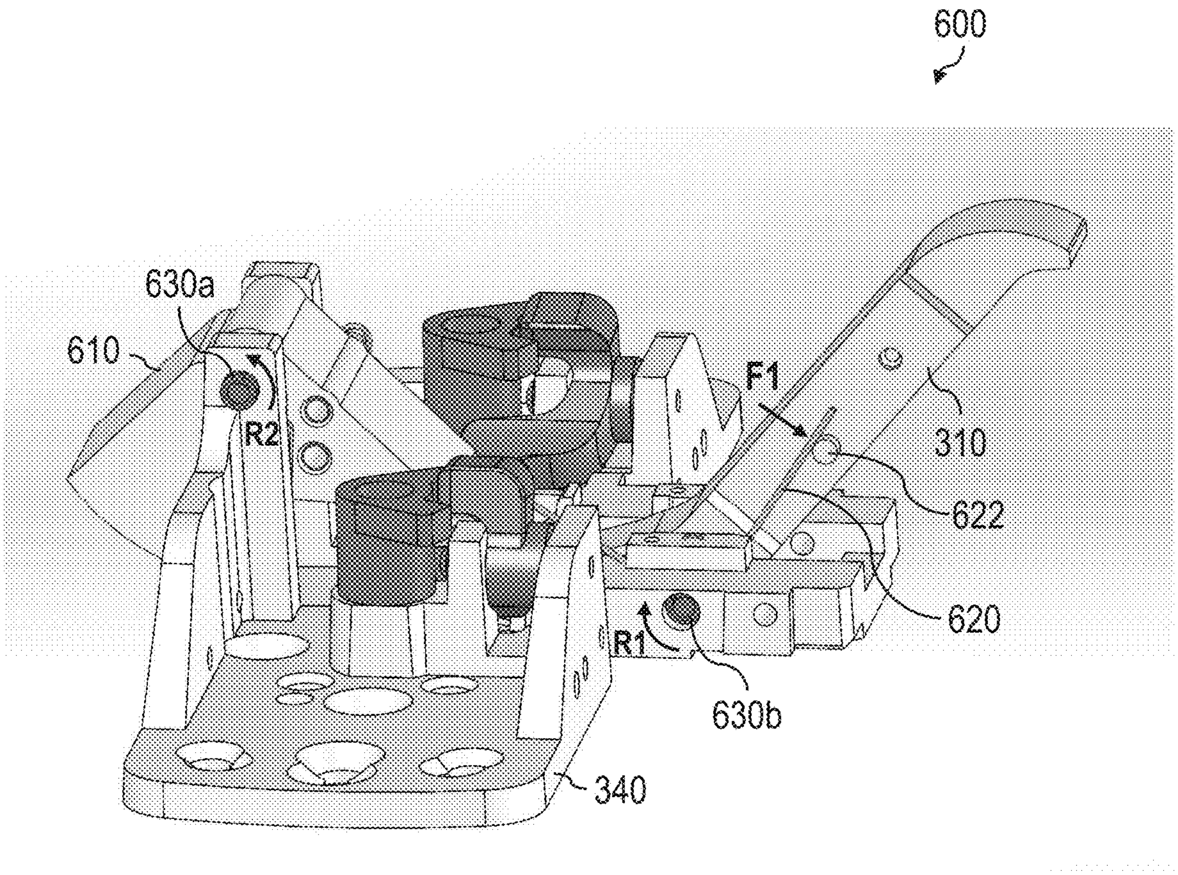
FIG. 6 shows a perspective view of an exit device according to some embodiments.

The door bolt 610 may be rotatable via a pin 630*a*. The door bolt 610 may be operatively coupled to the arm 310, such that movement of the arm 310 from the first arm position to the second arm position moves the door bolt 610 from the extended position to the retracted position. The arm 310 may also be rotatable via a pin 630*b*. A biasing member 620 may be coupled to the arm 310 and configured to bias the arm 310 to the second position, thereby biasing the bolt 610 toward the retracted position. In some embodiments, such as the depicted embodiment of FIG. 6, the biasing member 620 may be operatively coupled to the arm 310 via an arm element 622 formed on the arm 310. The arm element 622 is depicted as a protrusion extending from the arm 310 in the depicted embodiment of FIG. 6, although the arm element 622 may be formed in any appropriate geometry or configuration as the disclosure is not limited in this sense. A biasing force "F1" exerted by the biasing member 620 may be directed to the arm element 622, or any other appropriate portion of the arm 310 to bias the arm 310 to the second arm position. The biasing force "F1" experienced by the arm element 622 and/or arm 310 may be directionally linear in the direction of the arrow associated with "F1", however, the biasing member 620 may exert a directionally rotational biasing force. For example, the biasing member 620 as depicted in FIG. 6 may be formed as a torsion spring. The biasing force "F1" may bias the arm 310 to rotate via the rotatable member 630*b* in a direction "R1", which is shown as clockwise relative to FIG. 6 as depicted. The bias on the arm 310 may thereby bias the bolt 610 to rotate via the rotatable element 630*a* in a direction "R2" towards the retracted position, which is shown as counterclockwise relative to FIG. 6 as depicted.

Figure 7A:
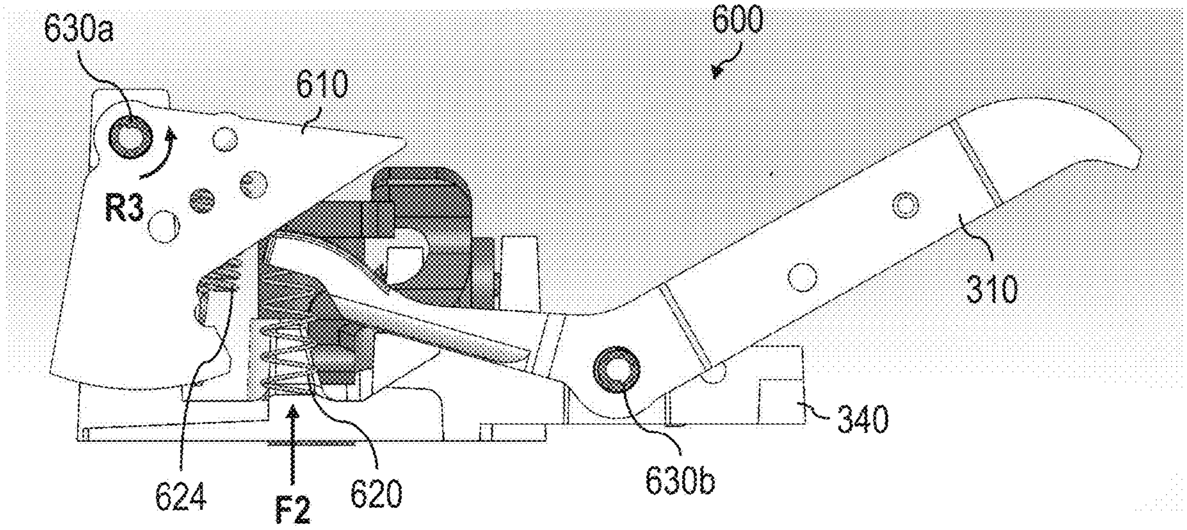
FIG. 7A shows a cross-sectional side view of an exit device according to some embodiments.
Figure 7B:
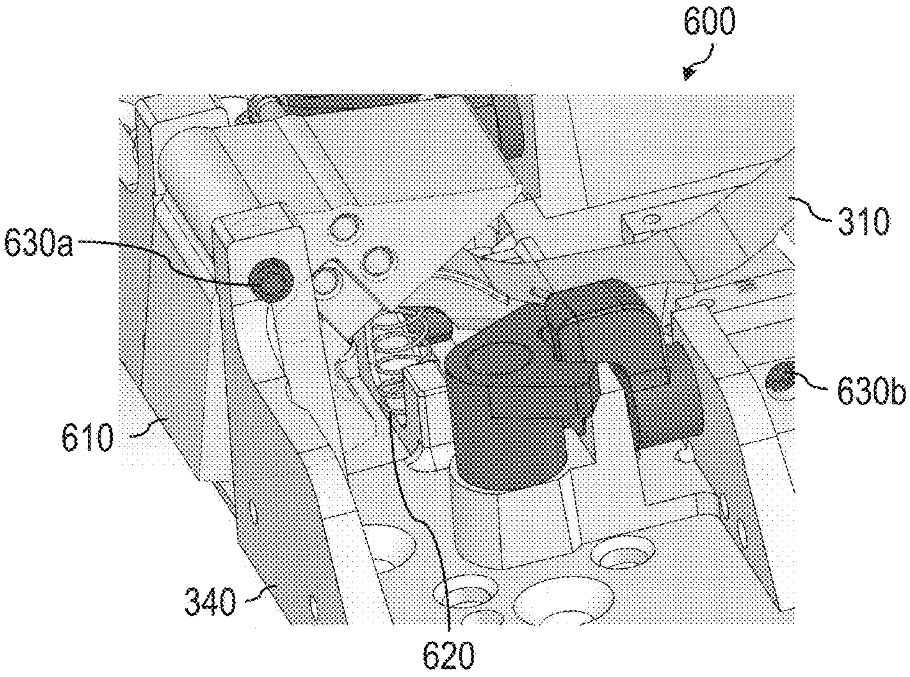
FIG. 7B shows a perspective view of a portion of the exit device of FIG. 7A according to some embodiments.
Figure 8:
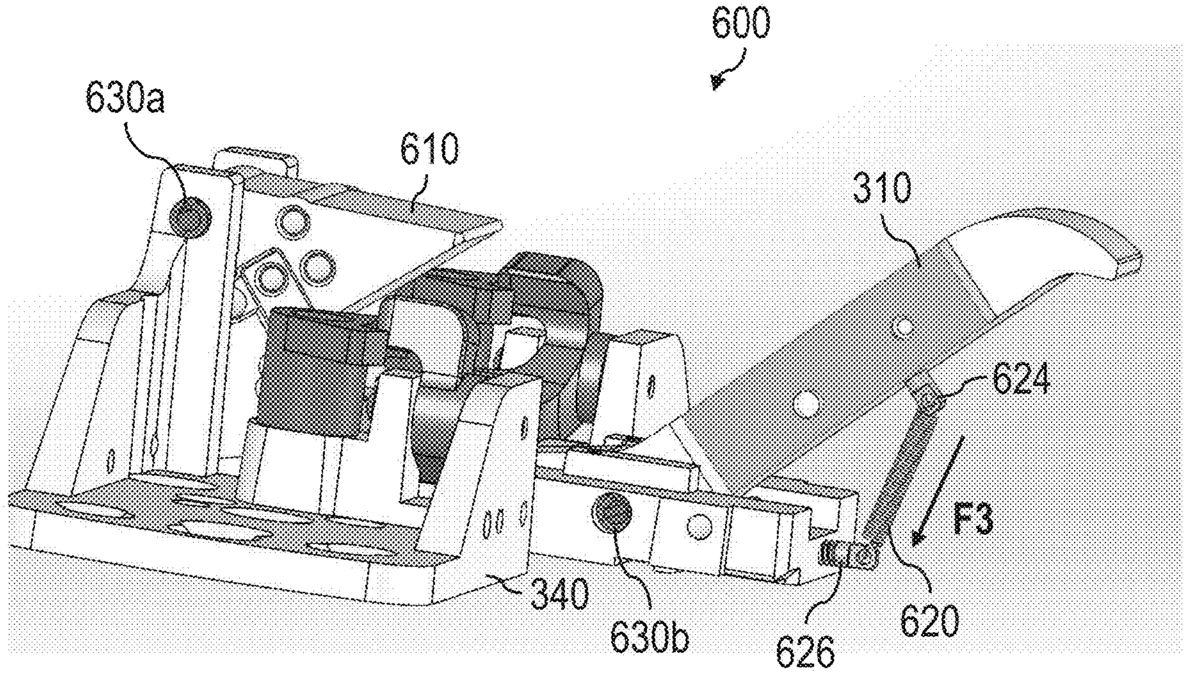
FIG. 8 shows a perspective view of an exit device according to some embodiments.

In the depicted embodiments of FIGS. 7A and 7B, the biasing member 620 is formed as a compression spring operatively coupled to the arm 310 of the exit device 600. The arm 310 and the bolt 610 as shown in the depicted embodiments of FIGS. 7A and 7B are rotatable via pin 630*a* and 630*b*. The biasing member 620 may be configured to bias the arm 310 to the second arm position, thereby biasing the bolt 610 toward the retracted position. As shown in the depicted embodiment of FIG. 7A, the biasing member exerts a biasing force "F2" onto a distal portion of the arm 310. In some embodiments, the biasing force "F2" may act on a bottom surface of the arm 310 disposed on a bottom side opposite to a top side having a top surface configured to contact the bolt 610. The biasing member 620 may be coupled to the exit device base 340 according to some embodiments. The biasing force "F2" may bias the bolt 610 to rotate in a direction "R3" as shown in the depicted embodiment of FIG. 7A. The direction "R3" is shown counterclockwise relative to FIG. 7A as depicted.

The exit device 600 may include a bolt biasing member 624 according to some embodiments, such as the depicted embodiment of FIG. 7A. The bolt biasing member 624 may be coupled to the bolt 610 and configured to bias the bolt towards a direction. For example, the bolt biasing member 624 may bias the bolt 610 towards the extended bolt position. In embodiments where the bolt biasing member 624 biases the bolt 610 towards the extended bolt position, the bolt biasing member 624 may reduce a force to move the push bar from the unactuated position to the actuated position. In some embodiments, the bolt biasing member 624 is coupled to the bolt 610 and a portion of the exit device base 340. It should be appreciated that the bolt biasing member 624 may be employed in any appropriate embodiment described herein, including the depicted embodiments of FIGS. 6-8.

In some embodiments, an exit device 900 may include a slide plate 910 operatively coupled to the push bar. The slide plate 910 may move from a first slide plate position to a second slide plate position, wherein movement of the push bar from the unactuated position to the actuated position moves the slide plate 610 from the first slide plate position to the second slide plate position. In some embodiments, such as the depicted embodiment of FIG. 9A, the slide plate 910 may be disposed on a bottom portion of the exit device 900. For example, the slide plate 910 may be coupled to and/or disposed proximate to a bottom surface of the exit device 900. In some embodiments, the exit device 900 includes a first movable number 910 and a second movable member 912. The first movable member 910 may be formed as an arm or any other appropriate movable member. The second movable member 912 may be formed as a lever or any other appropriate movable member. The first movable member 910 may be configured to move between an initial first movable member position and another first movable member position. The second movable member 912 may be configured to move between an initial second movable member position and another second movable member position. In some embodiments, including the depicted embodiment of FIG. 9A, the exit device 900 may include a biasing member 920 coupled to the slide plate 910. The biasing member 920 may also be coupled to any appropriate portion of the exit device 900, for example, any appropriate element or feature formed on the bottom portion of the exit device 900.

The biasing member 920 may be configured to bias the slide plate 910 to the second slide plate position. In some embodiments, such as the depicted embodiment of FIGS. 9A and 9B, the biasing member 920 may exert a biasing force "F4" on the slide plate 910. In some cases, the biasing member 920 exerts a directionally linear force on the slide plate 910. The biasing force "F4" may thereby reduce a force to move the push bar from the un-actuated position to the actuated position. The slide plate 910 may optionally be employed in exit devices including vertical rods and/or door bolts as the disclosure is not limited in this sense.

Figure 9A:
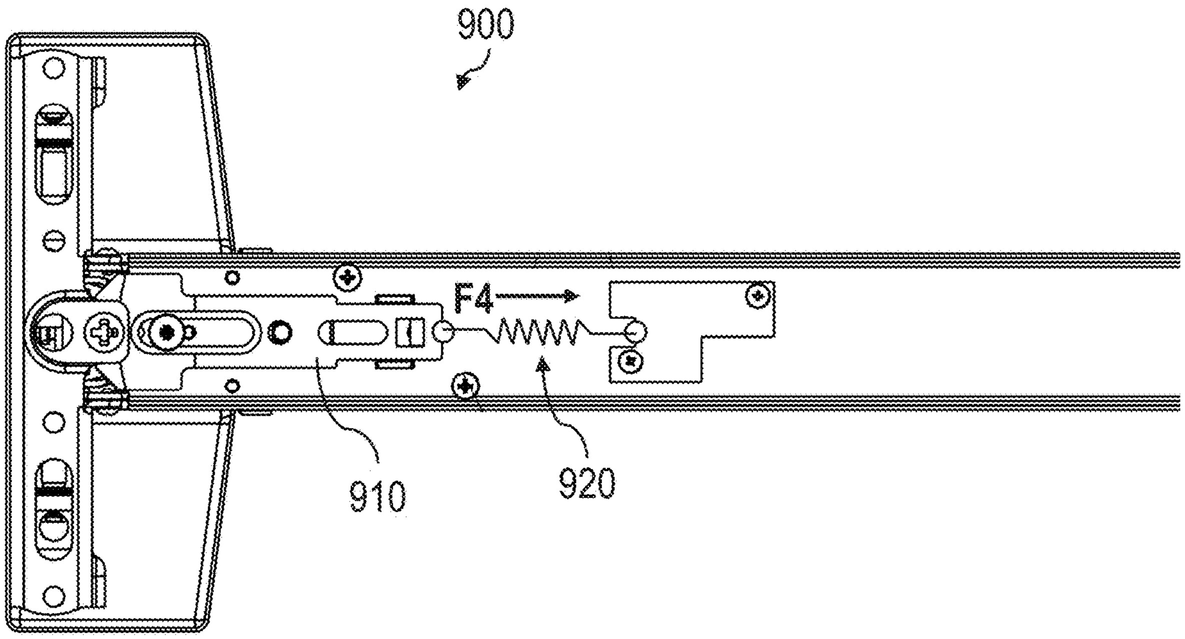
FIG. 9A shows a bottom view of an exit device according to some embodiments.
Figure 9B:
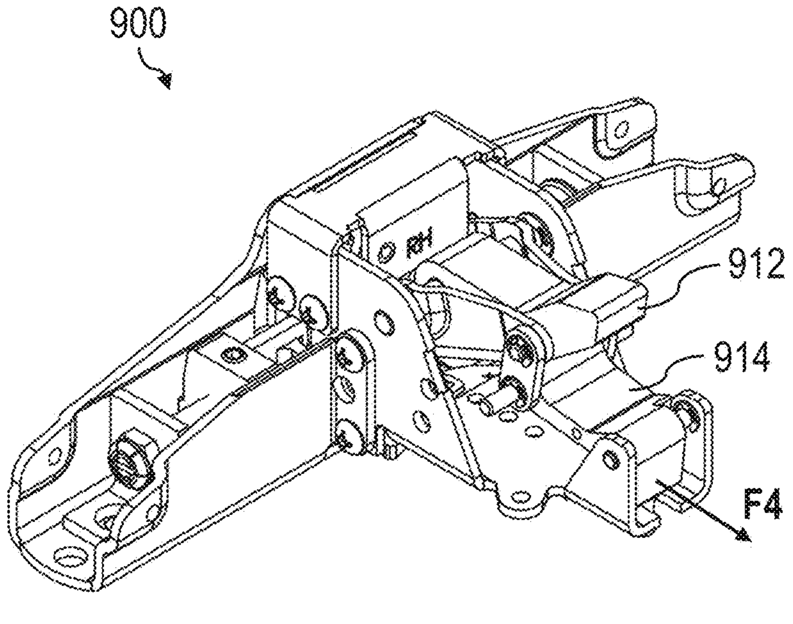
FIG. 9B shows a perspective view of a portion of the exit device of FIG. 9A according to some embodiments.
Figure 10:
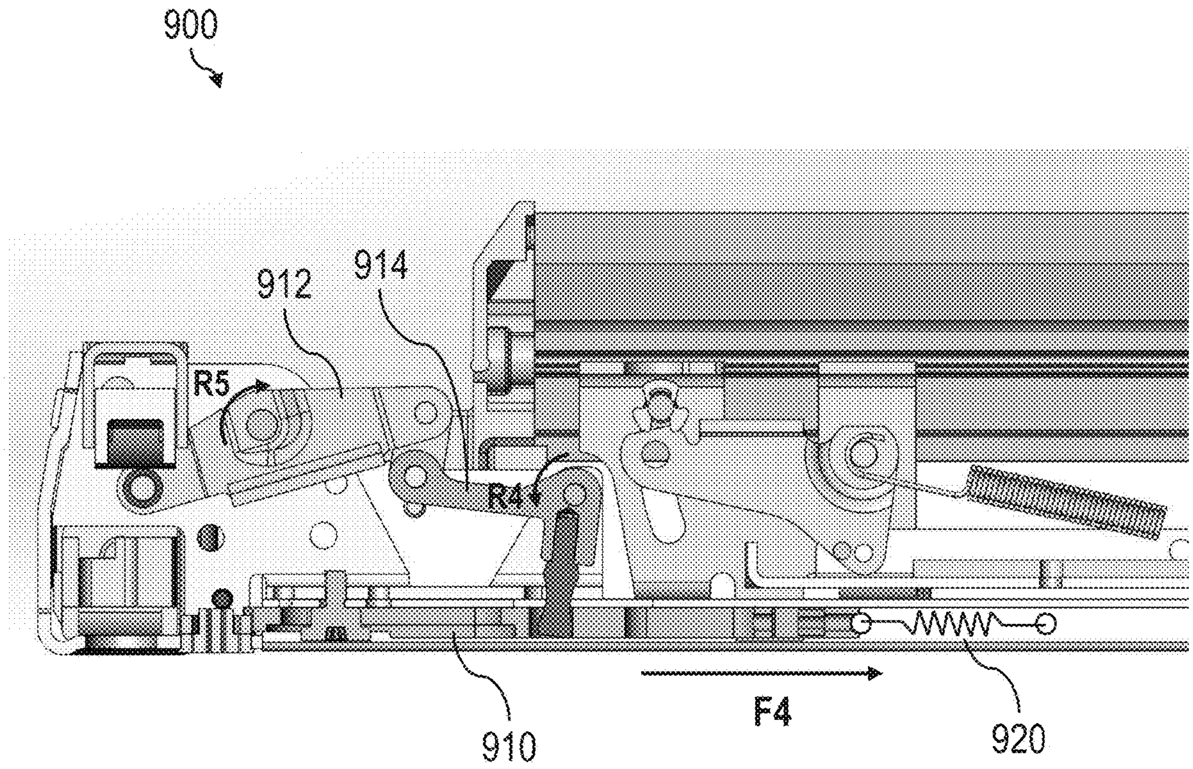
FIG. 10 shows a cross-sectional side view of a portion of the exit device of FIGS. 9A-9B according to some embodiments.

A side view of the exit device 900 depicted in FIGS. 9A and 9B is shown in FIG. 10. As shown in FIG. 10, the biasing member 920 exerts a biasing force "F4" in a direction parallel to the arrow associated with "F4" as shown in FIG. 10. The biasing force "F4" may bias the slide plate 910 in a direction parallel to the biasing force "F4". The second movable member 914 may be operatively coupled to the slide plate 910. The biasing force "F4" may bias the second movable member 914 towards the another second movable member position, which may bias the second movable member 914 in a direction parallel to the biasing direction "R5" as shown in the depicted embodiment of FIG. 10. The biasing force "F4" may also bias the first movable member 912 towards a direction via the second movable member 914. For example, the first movable member 912 may be biased in a direction parallel to a biasing direction "R5" as shown in the depicted embodiment of FIG. 10. It should be understood that any appropriate element of the exit device 900 may be contained within a chassis of the exit device 900.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An exit device comprising:

a push bar movable between an unactuated position and an actuated position;

an arm operatively coupled to the push bar, wherein the arm is movable between a first arm position and a second arm position, and wherein movement of the push bar from the unactuated position to the actuated position moves the arm from the first arm position to the second arm position;

a slide operatively coupled to the arm, wherein the slide is movable in a linear direction of movement between a first slide position and a second slide position, and wherein movement of the arm from the first arm position to the second arm position moves the slide from the first slide position to the second slide position; and one or more biasing members coupled to the slide and configured to bias the slide to the second slide position, thereby reducing a force to move the push bar from the unactuated position to the actuated position.

2. The exit device of claim 1, wherein the arm is configured to rotate between the first arm position and the second arm position.

3. The exit device of claim 1, wherein the one or more biasing members includes one or more springs.

4. The exit device of claim 1, wherein the slide includes one or more slide attachment members and further comprising an exit device base, and wherein each biasing member of the one or more biasing members is coupled to a slide attachment member of the one or more slide attachment members and the exit device base.

5. The exit device of claim 1, wherein the exit device is configured to be coupled to a door.

6. The exit device of claim 1, further comprising a rod operatively coupled to a latch for securing a door, wherein the rod is operatively coupled to the slide, wherein the rod is movable between a first rod position and a second rod position, and wherein movement of the slide from the first slide position to the second slide position moves the rod from the first rod position to the second rod position.

7. The exit device of claim 6, wherein the latch is movable between a latched position and an unlatched position, and wherein movement of the rod from the first rod position to the second rod position moves the latch from latched position to the unlatched position.

8. The exit device of claim 1, wherein the slide is configured to move from the first slide position to the second slide position in a direction of movement that is opposite to a local direction of gravity.

9. The exit device of claim 1, wherein a force to move the push bar from the unactuated position to the actuated position is equal to or less than 5 lbf.

10. The exit device of claim 1, wherein the push bar includes one or more push bar biasing members configured to bias the arm to the first arm position.

11. An exit device comprising:

a push bar movable between an unactuated position and an actuated position;

an arm operatively coupled to the push bar, wherein the arm is movable between a first arm position and a second arm position, and wherein movement of the push bar from the unactuated position to the actuated position moves the arm from the first arm position to the second arm position;

a lever operatively coupled to the arm, wherein the lever is movable between a first lever position and a second lever position, and wherein movement of the arm from the first arm position to the second arm position moves the lever from the first lever position to the second lever position;

a slide operatively coupled to the lever, wherein the slide is movable in a linear direction of movement between a first slide position and a second slide position, and wherein movement of the lever from the first lever position to the second lever position moves the slide from the first slide position to the second slide position; and one or more biasing members coupled to the slide and configured to bias the slide to the second slide position, thereby reducing a force to move the push bar from the unactuated position to the actuated position.

12. The exit device of claim 11, wherein the lever is configured to rotate between the first lever position and the second lever position.

13. The exit device of claim 11, wherein the exit device is configured to be coupled to a door, and further comprising a rod operatively coupled to a latch for securing the door, wherein the rod is operatively coupled to the slide, wherein the rod is movable between a first rod position and a second rod position, and wherein movement of the slide from the first slide position to the second slide position moves the rod from the first rod position to the second rod position.

14. The exit device of claim 11, wherein the slide is configured to move from the first slide position to the second slide position in a direction of movement that is opposite to a local direction of gravity.

15. The exit device of claim 11, wherein a force to move the push bar from the unactuated position to the actuated position is equal to or less than 5 lbf.

16. An exit device comprising:

a push bar movable between an unactuated position and an actuated position;

an arm operatively coupled to the push bar, wherein the arm is rotatable between a first arm position and a second arm position, and wherein movement of the push bar from the unactuated position to the actuated position rotates the arm from the first arm position to the second arm position;

a lever operatively coupled to the arm, wherein the lever is rotatable between a first lever position and a second lever position, and wherein rotation of the arm from the first arm position to the second arm position rotates the lever from the first lever position to the second lever position;

a slide operatively coupled to the lever, wherein the slide is movable in a linear direction of movement between a first slide position and a second slide position, and wherein rotation of the lever from the first lever position to the second lever position moves the slide from the first slide position to the second slide position, wherein the exit device is configured to be coupled to a door;

a rod operatively coupled to a latch for securing the door, wherein the rod is operatively coupled to the slide, wherein the rod is movable between a first rod position and a second rod position, and wherein movement of the slide from the first slide position to the second slide position moves the rod from the first rod position to the second rod position, wherein the latch is movable between a latched position and an unlatched position, and wherein movement of the rod from the first rod position to the second rod position moves the latch from latched position to the unlatched position; and one or more springs coupled to the slide and configured to bias the slide to the second slide position, thereby reducing a force to move the push bar from the unactuated position to the actuated position.

17. The exit device of claim 16, wherein the lever is configured to rotate between the first lever position and the second lever position.

18. The exit device of claim 16, wherein the slide is configured to move from the first slide position to the second slide position in a direction of movement that is opposite to a local direction of gravity.

19. The exit device of claim 16, wherein a force to move the push bar from the unactuated position to the actuated position is equal to or less than 5 lbf.

20. The exit device of claim 16, wherein the push bar includes one or more push bar biasing members configured to bias the arm to the first arm position.

21. An exit device comprising:

a push bar movable between an unactuated position and an actuated position;

a bolt operatively coupled to the push bar, wherein the bolt is movable between a bolt extended position and a bolt retracted position, and wherein movement of the push bar from the unactuated position to the actuated position moves the bolt from the bolt extended position to the bolt retracted position and wherein the bolt is configured to secure the exit device in the bolt extended position;

an arm operatively coupled to the push bar, wherein the arm is movable between a first arm position and a second arm position, and wherein movement of the push bar from the unactuated position to the actuated position moves the arm from the first arm position to the second arm position; and one or more arm biasing members coupled to the arm and configured to bias the arm to the second arm position, thereby reducing a force to move the push bar from the unactuated position to the actuated position.

22. The exit device of claim 21, wherein at least one of the one or more arm biasing members is a linear biasing member configured to bias the arm to the second arm position using a directionally linear biasing force.

23. The exit device of claim 21, wherein at least one of the one or more arm biasing members is a rotational biasing member configured to bias the arm to the second arm position using a directionally rotational biasing force.

24. The exit device of claim 21, wherein a force to move the push bar from the unactuated position to the actuated position is equal to or less than 5 lbf.

25. An exit device comprising:

a push bar movable between an unactuated position and an actuated position;

an arm operatively coupled to the push bar, wherein the arm is movable between a first arm position and a second arm position, and wherein movement of the push bar from the unactuated position to the actuated position moves the arm from the first arm position to the second arm position;

a slide plate operatively coupled to the arm, wherein the slide plate is movable in a linear direction of movement between a first slide plate position and a second slide plate position, and wherein movement of the arm from the first arm position to the second arm position moves the slide plate from the first slide plate position to the second slide plate position; and one or more slide plate biasing members coupled to the slide plate and configured to bias the slide plate to the second slide plate position, thereby reducing a force to move the push bar from the unactuated position to the actuated position.

26. The exit device of claim 25, wherein at least one of the one or more slide plate biasing members configured to bias the slide plate to the second slide plate position is a linear biasing member configured to bias the slide plate to the second slide plate position using a directionally linear biasing force.

27. The exit device of claim 25, wherein a force to move the push bar from the unactuated position to the actuated position is equal to or less than 5 lbf.

* * * * *